United States Patent [19]
Crank

[11] 3,831,383
[45] Aug. 27, 1974

[54] HOLE PLUGGING METHOD
[75] Inventor: Gerald E. Crank, Casper, Wyo.
[73] Assignee: Hole Pluggers, Inc., Casper, Wyo.
[22] Filed: July 18, 1972
[21] Appl. No.: 272,891

[52] U.S. Cl. .................................. 61/35, 166/295
[51] Int. Cl. ............................................ E02d 3/08
[58] Field of Search .......... 166/295, 291, 292, 285; 61/35; 52/742, 743; 47/37

[56] References Cited
UNITED STATES PATENTS

| | | | |
|---|---|---|---|
| 1,971,504 | 8/1934 | Pratt | 47/56 |
| 2,811,839 | 11/1957 | McReynolds, Jr. | 61/35 |
| 2,867,278 | 1/1959 | Mallory | 166/295 |
| 2,911,646 | 11/1959 | Yahn | 166/295 |
| 3,070,163 | 12/1962 | Colby et al. | 166/295 |
| 3,141,513 | 7/1964 | Davis | 166/295 |
| 3,170,516 | 2/1965 | Holland et al. | 166/295 |
| 3,447,608 | 6/1969 | Fry et al. | 166/295 |
| 3,525,398 | 8/1970 | Fisher | 166/295 |

OTHER PUBLICATIONS
Bulletin of The Green Section Of The U.S. Golf Association, Vol. II, July 17, 1922, No. 7, page 208.

*Primary Examiner*—Robert R. Mackey
*Assistant Examiner*—Alex Grosz
*Attorney, Agent, or Firm*—Clarence A. O'Brien; Harvey B. Jacobson

[57] ABSTRACT

Holes in the earth surface and the like are plugged by first placing a prefabricated plug at a predetermined position in a hole to be plugged, and then arranging in the hole another plug above and limited by the prefabricated plug. The another plug is preferably formed in the hole by expanding a water-tight material such as a polyurethane so as to block the hole. A further plug constructed from a non-settling material such as a vermiculite is arranged in the hole above the expanded water-tight plug. Topsoil and seed may be placed above the further plug for finishing the hole plugging procedure. The prefabricated plug may have a substantially circular, planar base member provided with peripheral portions and diverging walls extending from the peripheral portions in a common direction from the base member. The diverging walls may have a plurality of corrugations arranged extending in a direction of divergence of the walls for permitting the adjustment of the walls to various size holes. The further plug may be preformed and combined with the topsoil and seed element to form a pre-packaged unit. The steps of placing the prefabricated plug and forming the expanded, water-tight plug may be used to fill voids adjacent to and communicating with the hole. After the expanded plug has been formed, the hole may be re-drilled without removing the expanded material from the voids.

9 Claims, 8 Drawing Figures

PATENTED AUG 27 1974

HOLE PLUGGING METHOD

BACKGROUND OF THE INVENTION

1. Field of the Invention

This invention relates to a method for plugging holes such as wells and the like, and to apparatus for carrying out the method.

2. Description of the Prior Art

It is frequently desirable, or even mandatory, to plug holes that have been drilled in the earth for any reason or purpose, such as for a well. If left unplugged, these holes create a danger to animal life and increase the possibility of errosion in the surrounding soil. Further, voids in the earth adjacent to and communicating with the hole may cause unstable soil conditions permitting cave-ins and the like. In addition, these voids may reduce the efficiency of a well and make it difficult to continue drilling a well because the voids will divert a circulating drilling fluid.

SUMMARY OF THE INVENTION

It is an object of the present invention to provide a simple, inexpensive, and reliable method for plugging holes that will eliminate the situations referred to above.

It is another object of the present invention to provide apparatus for assisting in carrying out the method according to the present invention.

These and other objects are achieved according to the present invention by providing a method for plugging holes and the like having the steps of placing a prefabricated plug at a predetermined position in a hole to be plugged, and arranging in the hole another plug above and limited by the prefabricated plug. A further plug is advantageously arranged in the hole above the another plug, while topsoil and seed may be placed in the hole above the further plug.

According to an advantageous feature of a method according to the present invention, the step of arranging the plug includes the step of forming the plug in the hole and blocking same by expanding a water-tight material such as a polyurethane. If voids are present adjacent and communicating with the hole this expanded, water-tight material will also fill the voids.

A preferred embodiment of a prefabricated plug has a, for example, substantially circular, planar base member provided with peripheral portions. Diverging walls extend from the peripheral portions in a common direction with respect to the base member. A plurality of corrugations may be provided on the diverging walls, and arranged extending in their direction of divergence.

For convenience in installing the further plug in the hole, it may be a preformed plug constructed from a non-settling material such as a vermiculite. An element constructed from topsoil and seed may be arranged abutting the further plug for forming a unit which may be prepackaged and sold.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
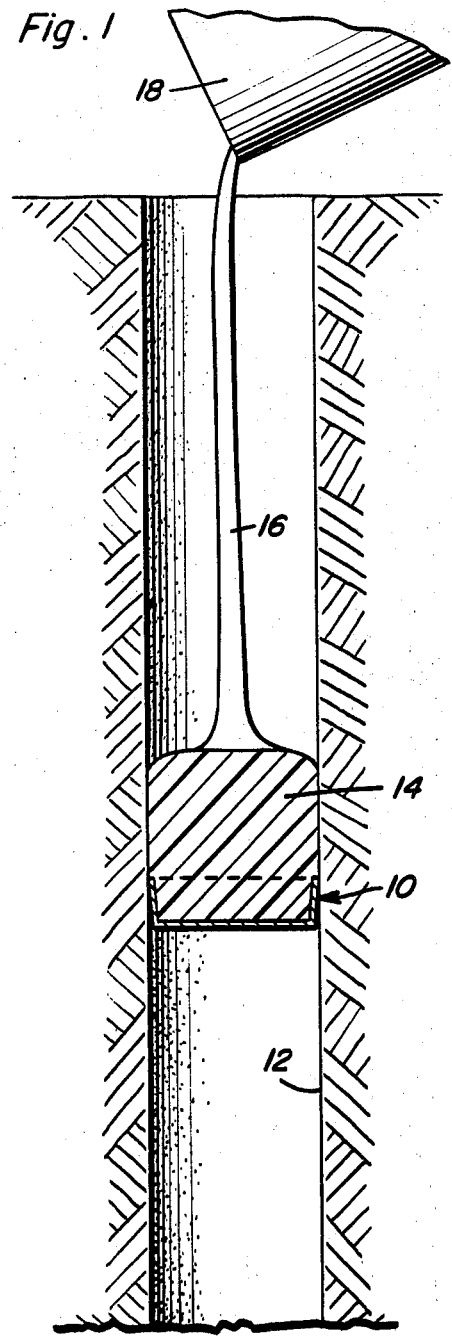
FIG. 1 is a schematic, vertical sectional view showing a hole to be plugged, and a stage in a method according to the present invention for plugging the hole.
Figure 2:
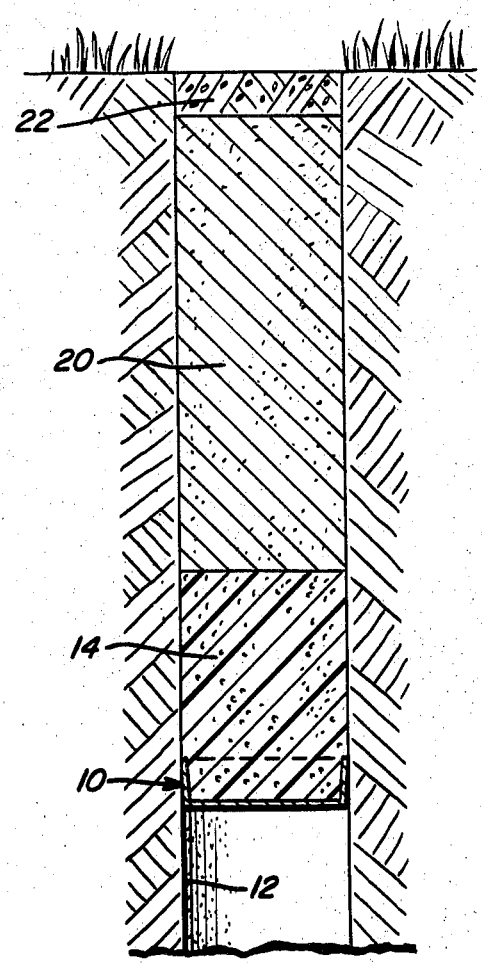
FIG. 2 is a schematic, vertical sectional view similar to FIG. 1, but showing a hole plugged according to a method of the present invention.

Referring now more particularly to FIGS. 1 and 2 of the drawings, a prefabricated plug 10 according to the present invention is shown placed in a known manner in a hole 12 to be plugged. Plug 10 may be positioned in hole 12 as by being rammed by a rod (not shown). Another plug 14 is arranged in the hole above and limited by plug 10. As is shown in FIG. 1 of the drawings, plug 14 is formed in hole 12 as by pouring a mixture 16 of an expandable material such as a polyurethane foam into hole 12 as from a container 18. Mixture 16 will expand in the hole 12 to form a water-tight plug blocking same. A further plug 20 formed from a non-settling material is arranged above and abutting plug 14 (FIG. 2), and a topsoil and seed element 22 is placed above plug 20 to finish off the plugging of hole 12. The seed in element 22 may be, for example, a grass seed which will restore the surface of the hole to a condition blending in with the surrounding area.

Mixture 16 may be formed by mixing known blowing and curing agents with a prepolymer as is well known in forming polyurethane foam type of thermosetting plastics. For example, approximately 4 ounces each of the agents and the prepolymer will fill a hole 12 approximately 6 inches in diameter to a depth of 12 inches. Mixture 16 may be poured into hole 12 and form a plug 14 in about, for example, 1 minute at standard temperature and pressure. The nature of the expansion of mixture 16 will force plug 14 up and against the walls of hole 12 to ensure a tight fit with respect thereto. By pouring mixture 16 into hole 12 and onto plug 10 and permitting it to foam instantaneously, the weight applied to plug 10 during the formation of the portion of plug 14 adjacent plug 10 will not be sufficient to dislodge plug 10 from its illustrated position in hole 12.

Plug 20 may be either preformed and placed into hole 12 or poured into hole 12 from bulk, and may be constructed from one of many suitable materials. However, those found most successful in practice have been a form of micaceous materials, especially an expanded vermiculite such as marketed under the name Vermiculite and the registered trademark "Zonolite". These materials, which are made usable by being greatly expanded at high temperature, give a light-weight end product which is commonly used as an insulating material. However, it is its non-settling properties which are of particular interest for use with a method according to the present invention.

Figure 3:
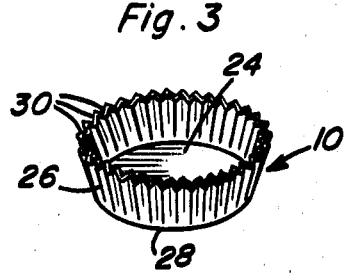
FIG. 3 is a perspective view of apparatus for use with a method according to the present invention.

FIG. 3 of the drawings shows a prefabricated plug 10 according to the present invention having a substantially circular, planar base member 24 with a diverging, enclosing wall 26 extending from a peripheral portion 28 of base member 24 and in a common direction with respect to base member 24. Wall 26 is provided with a plurality of corrugations 30 arranged extending in a direction of divergence of wall 26 for permitting adjustment of wall 26 to various size holes 12. A paper material such as cardboard may be used for constructing plug 10.

Figure 4:
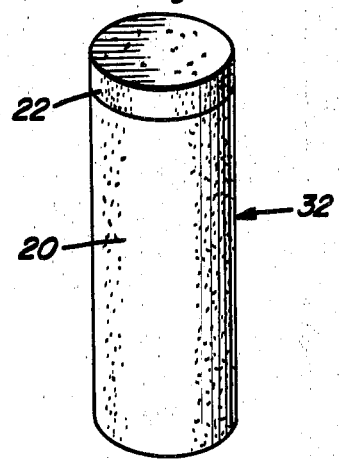
FIG. 4 is a perspective view showing additional apparatus for use with a method according to the present invention.

FIG. 4 of the drawings shows an arrangement according to the present invention wherein an element 22 is arranged abutting a plug 20 for forming a unit 32 therewith. This unit 32 may be packaged in a single container for convenience in use and marketing.

Figure 5:
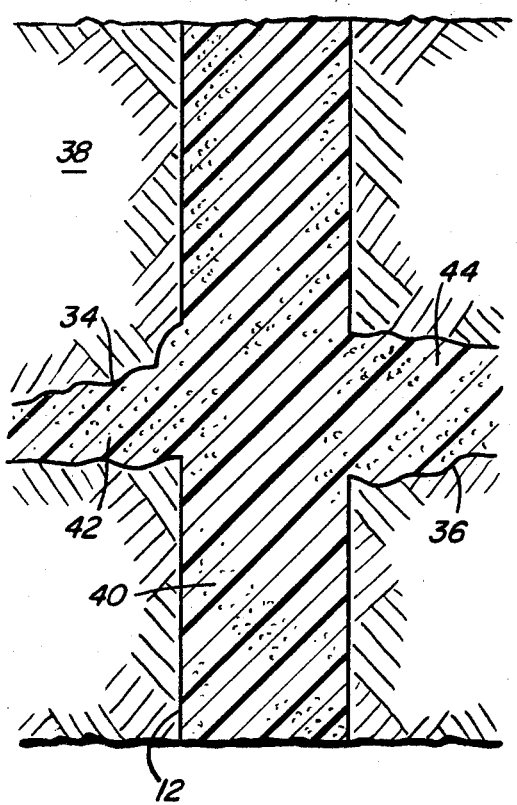
FIGS. 5 and 6 are schematic, vertical sectional views taken through a hole in the earth showing an alternative application of a method according to the present invention.
Figure 6:
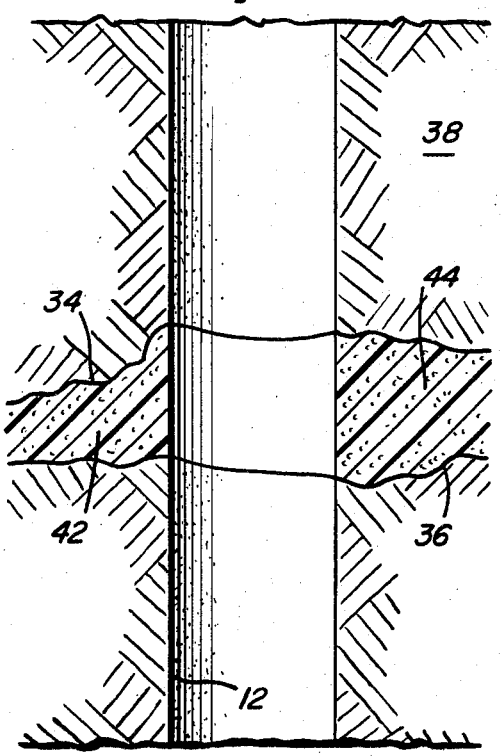

Referring now to FIGS. 5 and 6 of the drawings, a hole 12 is illustrated having, for example, a pair of voids 34, 36 adjacent and communicating therewith. In actuality, voids 34, 36 could be a single void encircling hole 12. These voids will cause the earth 38 in which hole 12 has been, for example, drilled to be unstable, and would also divert circulating drilling fluid in the event hole 12 is still in the process of being drilled. To eliminate these voids 34, 36, a plug 40 is formed in hole 12 in accordance with the method set out above by placing a plug 10 (not shown in FIG. 5), and expanding a mixture 16 in hole 12 so as to form portions 42, 44 in voids 34, 36, respectively. If it is desired to still use hole 12, plug 40 may be simply drilled out in a known manner leaving the arrangement shown in FIG. 6 of the drawings.

Figure 7:
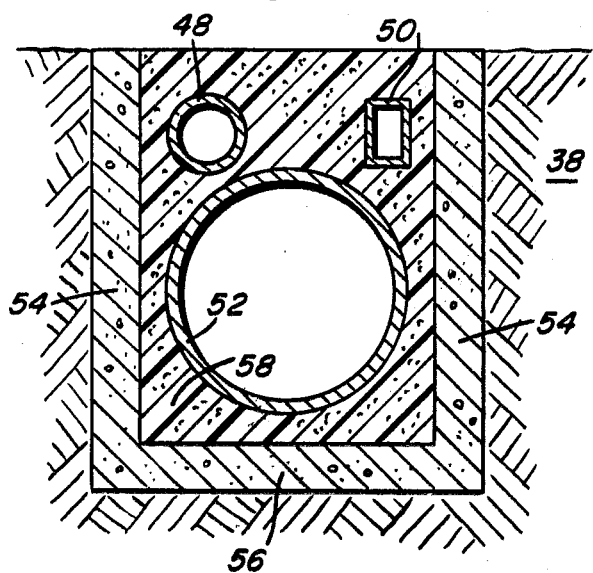
FIG. 7 is a schematic, vertical sectional view taken through a trench arranged in the earth showing encapsulated pipes or conduits arranged in the trench.
Figure 8:
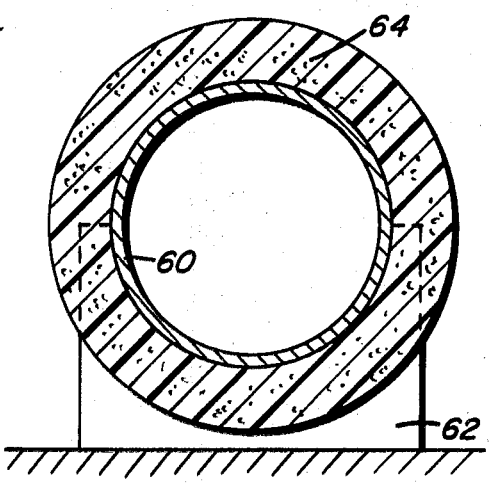
FIG. 8 is a schematic, vertical sectional view showing a pipe or conduit covered with an insulating material.

FIGS. 7 and 8 of the drawings show applications of polyurethane foam which may be used to surround pipelines, conduits, raceways, and the like, arranged on cradles, hangers, in trenches, inside other conduits, and the like for preventing damage to the surrounding physical environment by leakage and the like therefrom. Specifically, FIG. 7 shows a trench 46 having a plurality of pipes or conduits 48, 50, and 52 arranged therein. Trench 46 may be formed by, for example, concrete walls 54, 56 as illustrated. A mixture 16 may be poured into trench 46 to fill same with a, for example, polyurethane foam 58 and encapsulate pipes or conduits 48, 50, and 52. FIG. 8 shows an arrangement wherein a pipe or conduit 60 mounted on a cradle 62 may be provided with a water-tight, insulated layer 64 as by spraying a mixture 16 onto the pipe or conduit 60 in a known manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method for plugging holes and the like, comprising the steps of:
    a. placing a prefabricated plug at a predetermined position in a hole to be plugged; and
    b. forming in the hole another plug above and limited by the prefabricated plug, the forming including the steps of pouring a mixture of blowing and curing agents and a prepolymer into the hole and onto the prefabricated plug at a weight insufficient to dislodge the prefabricated plug from the predetermined position thereof, and of instantaneously expanding the mixture into a water-tight material to fit tightly against walls of the hole and block the same.

2. A method as defined in claim 1, further including the step of arranging a further plug in the hole above and abutting the another plug.

3. A method as defined in claim 2, further including the step of placing topsoil and seed in the hole above the further plug.

4. A method as defined in claim 3, wherein the step of arranging a further plug includes the step of placing in the hole a preformed plug constructed from a non-settling material.

5. A method as defined in claim 3, wherein the step of arranging a further plug includes the step of pouring a non-settling bulk material into the hole.

6. A method as defined in claim 2, wherein the step of arranging a further plug includes the step of placing in the hole a preformed plug constructed from a non-settling material.

7. A method as defined in claim 2, wherein the step of arranging a further plug includes the step of pouring a non-settling bulk material into the hole.

8. A method as defined in claim 1, wherein the step of placing includes the step of providing a prefabricated plug adjustable to different size holes, and the step of expanding includes the step of filling voids adjacent and communicating with the hole.

9. A method as defined in claim 8, further including the step of reopening only the plugged hole, so that the voids remain filled.

* * * * *